United States Patent
Ramakrishnan et al.

(10) Patent No.: US 11,920,539 B1
(45) Date of Patent: Mar. 5, 2024

(54) GAS TURBINE EXHAUST NOZZLE NOISE ABATEMENT

(71) Applicant: General Electric Company, Schenectady, NY (US)

(72) Inventors: Kishore Ramakrishnan, Rexford, NY (US); Steven B. Morris, Mason, OH (US); Nikolai N. Pastouchenko, Latham, NY (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/964,097

(22) Filed: Oct. 12, 2022

(51) Int. Cl.
   *F02K 1/48* (2006.01)
   *F01D 25/30* (2006.01)

(52) U.S. Cl.
   CPC ............... *F02K 1/48* (2013.01); *F01D 25/30* (2013.01); *F05D 2220/323* (2013.01); *F05D 2240/128* (2013.01); *F05D 2260/96* (2013.01)

(58) Field of Classification Search
   CPC ... F02K 1/48; F02K 1/78; F02K 1/827; F02K 1/44; F02K 1/06; F02K 1/08–1292; F05D 2240/128; F05D 2220/323; F05D 2260/96
   See application file for complete search history.

(56) References Cited

U.S. PATENT DOCUMENTS

| | | | |
|---|---|---|---|
| 6,658,839 B2 | 12/2003 | Herbert | |
| 6,826,901 B2 | 12/2004 | Herbert | |
| 7,543,452 B2 | 6/2009 | Reba et al. | |
| 7,966,824 B2 | 6/2011 | Mengle | |
| 8,356,468 B2 | 1/2013 | Cerra et al. | |
| 8,511,090 B2 | 8/2013 | Mengle | |
| 8,887,489 B2 | 11/2014 | Sylla et al. | |
| 9,249,755 B2 | 2/2016 | Szydlowski et al. | |
| 2004/0244357 A1 | 12/2004 | Sloan | |
| 2010/0257865 A1* | 10/2010 | Mengle | B64D 33/04 60/770 |
| 2013/0206865 A1* | 8/2013 | Szydlowski | F02K 1/48 239/265.11 |
| 2017/0082063 A1* | 3/2017 | Mengle | B64D 33/06 |
| 2021/0301827 A1* | 9/2021 | Stretton | F01D 5/12 |

* cited by examiner

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

An exhaust nozzle for a gas turbine engine. The exhaust nozzle comprises a nozzle body having an upstream end axially spaced from a downstream end with respect to an axial centerline of the nozzle body, and a plurality of chevrons circumferentially spaced apart and extending downstream from the downstream end. Each chevron includes an inner wall radially spaced from an outer wall, a root and a tip axially spaced from the root. At least one chevron of the plurality of chevrons includes a first segment extending axially downstream from the root, a second segment extending axially downstream from the first segment, and a third segment extending axially downstream from the second segment to the tip. The inner wall extends along the first segment, the second segment, and third the segment. The first segment is distinguishable from the second segment and the second segment is distinguishable from the third segment.

11 Claims, 9 Drawing Sheets

GAS TURBINE EXHAUST NOZZLE NOISE ABATEMENT

FIELD

The present invention relates generally to gas turbine engines, and, more specifically, to reduction of gas turbine engine exhaust noise.

BACKGROUND

Gas turbine engines may be used for aircraft propulsion. Gas turbine engines generate propulsive thrust via a core engine that produces a stream of hot exhaust gases discharged from an exhaust nozzle into ambient air. The exhaust gases exit the exhaust nozzle at a high velocity, particularly during take-off operation of the aircraft. The high velocity exhaust stream may interact with the ambient air to produce substantial noise along the take-off path of the aircraft.

BRIEF DESCRIPTION OF THE DRAWINGS

A full and enabling disclosure of the present disclosure, including the best mode thereof, directed to one of ordinary skill in the art, is set forth in the specification, which refers to the appended figures, in which.

DETAILED DESCRIPTION

Figure 1:
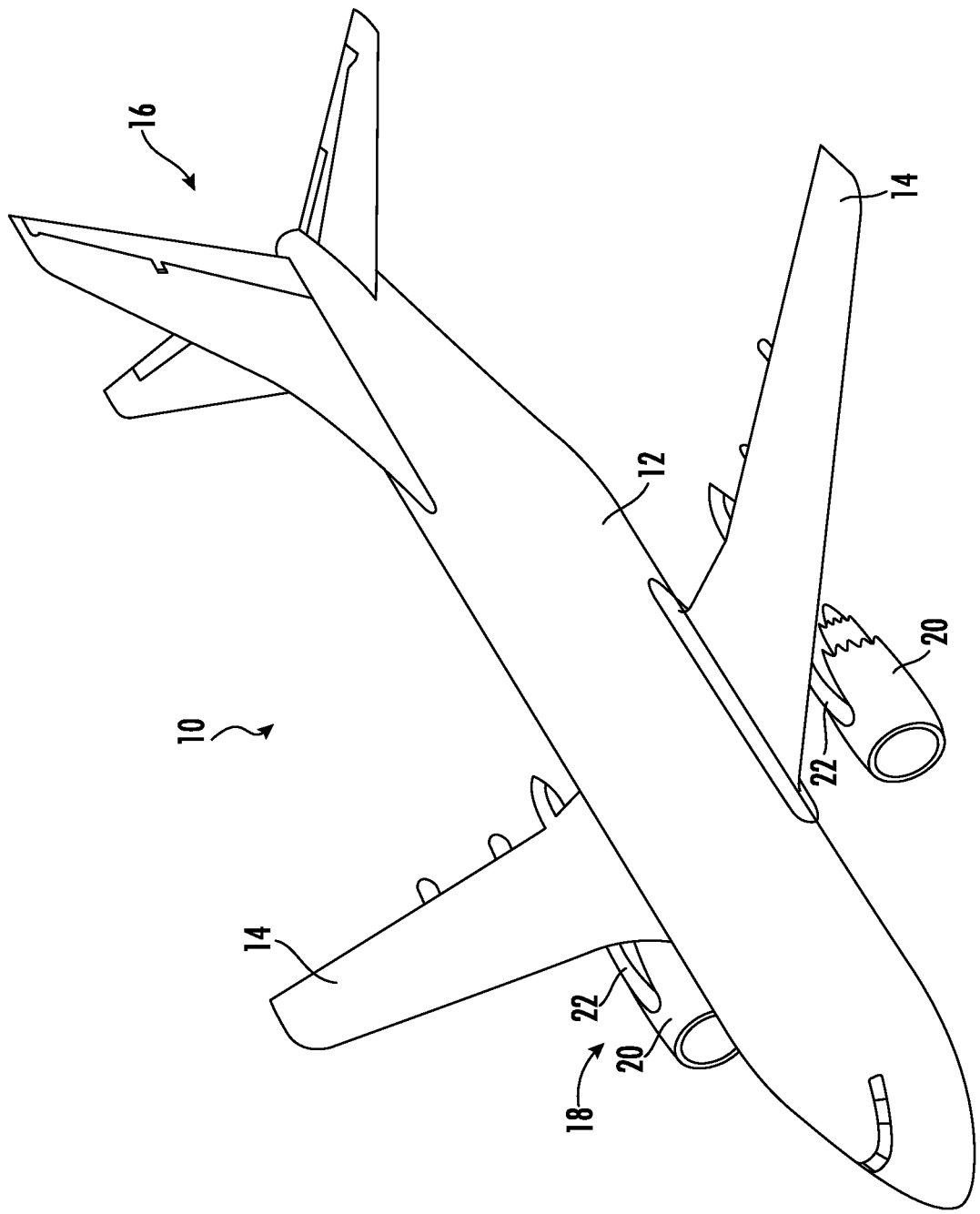
FIG. 1 is a perspective view of an exemplary aircraft as may incorporate one or more embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

A "segment" as used in this specification refers to a portion of an inner wall of a chevron measured along an overall axial length of the chevron. One segment is distinguished from another by a radial inflection or termination point measurable along the inner wall and with respect to an axial centerline of an exhaust nozzle to which a particular chevron is attached. Thus a "distinguishable segment" is defined between two axially spaced radial inflection or termination points.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle. In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The present disclosure is generally related to noise reduction for a gas turbine engine. Chevrons increase mixing of the jet exhaust stream with ambient air or air from a bypass flow passage of a gas turbine engine to reduce jet noise at takeoff conditions. Reducing jet noise at takeoff is very crucial for military, commercial supersonic and other low bypass ratio engines. Jet noise at takeoff, particularly for supersonic commercial aircraft, can often be an engine sizing criterion. Traditionally chevrons are parametrized (shaped and sized) by the count, length, and penetration into the flow of the exhaust gas stream as a function of the nozzle diameter. Higher chevron penetration generally provides more mixing (and therefore greater noise reduction) but also increases the thrust penalty at cruise conditions due to a reduction in effective jet exhaust nozzle flow area. This disclosure provides a chevron design with at least three distinguishable segments between a root and tip of the chevron, with each segment having different radii and curvature specifically sized and/or shaped to enable increased jet exhaust and ambient air mixing with a lower cruise thrust/performance penalty.

Referring now to the drawings, wherein identical numerals indicate the same elements throughout the figures, FIG. 1 is a perspective view of an exemplary aircraft 10 that may incorporate at least one exemplary embodiment of the present disclosure. As show in FIG. 1, the aircraft 10 has a fuselage 12, wings 14 attached to the fuselage 12, and an empennage 16.

The aircraft 10 further includes a propulsion system 18 that produces a propulsive thrust required to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. In the exemplary aircraft 10 shown in in FIG. 1, the propulsion system 18 includes a pair of gas turbine engines 20. Each gas turbine engine 20 is mounted to the aircraft 10 in an under-wing configuration through a respective pylon 22. Each gas turbine engine 20 is capable of selectively generating a propulsive thrust for the aircraft 10.

Figure 2:
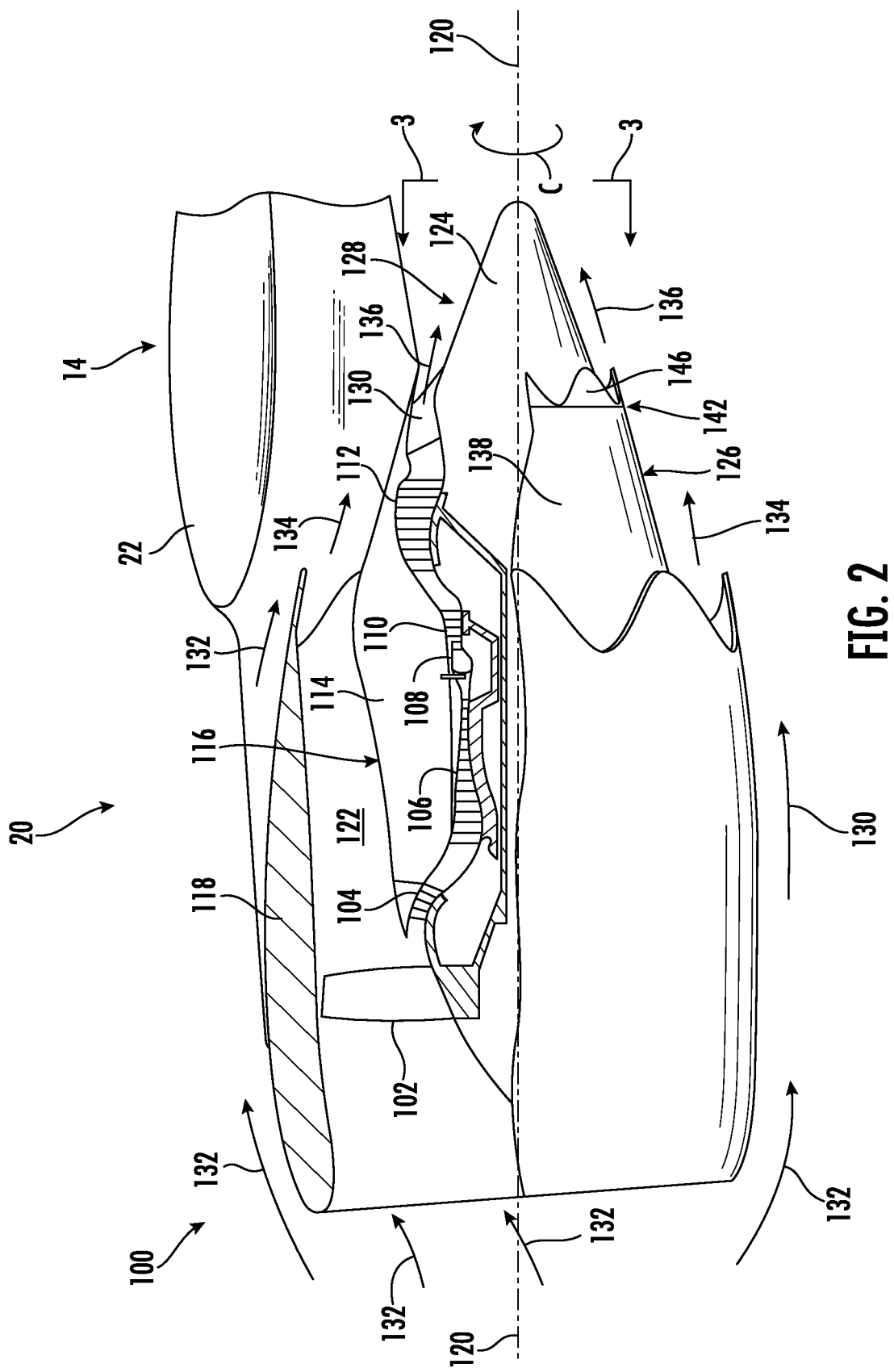
FIG. 2 illustrates an exemplary turbofan gas turbine engine according to at least one embodiment of the present disclosure.

FIG. 2 illustrates an exemplary turbofan gas turbine engine hereafter referred to an engine 100, according to at least one embodiment of the present disclosure. In certain embodiments, as shown in FIG. 2, the gas turbine engine 20 may comprise a turbofan gas turbine engine 100 which is suitably joined to a portion of wing 14 (FIG. 1) via pylon 22. The engine 100 includes in serial flow communication, a fan 102, a low-pressure compressor 104, a high-pressure compressor 106, a combustor 108, a high-pressure turbine 110, and a low-pressure turbine 112 operatively joined together in a conventional high-pressure spool/low-pressure spool turbofan configuration.

A core casing 114 at least partially surrounds the low-pressure compressor 104, high-pressure compressor 106, combustor 108, high-pressure turbine 110, and the low-pressure turbine 112. The core casing 114, low-pressure compressor 104, high-pressure compressor 106, combustor 108, high-pressure turbine 110, and the low-pressure turbine 112 collectively form a core engine 116 of the gas turbine engine 100. The gas turbine engine 100 further includes a fan nacelle or cowl 118 surrounding the fan 102 and at least part of the core engine 116.

The fan nacelle 118 is spaced radially outwardly from the core engine 116 with respect to an axial centerline 120 of the core engine 116 to define a bypass air duct 122 therebetween. In certain configurations, a center plug 124 extends aft and downstream from the low-pressure turbine 112. A core or jet exhaust nozzle 126 is positioned at an aft end 128 of the core engine 116 downstream from the low-pressure turbine 112. The exhaust nozzle 126 surrounds the center plug 124 when present and is axisymmetric about axial centerline 120. The exhaust nozzle 126 forms an exhaust outlet 130 for the core engine 116.

During operation, ambient air 132 flows past the fan 102 as well as around or outside the fan nacelle 118. A first portion of the ambient air 132 is pressurized by the fan 102 and discharged through the bypass air duct 122 as a fan exhaust 134 for producing thrust. A second portion of the ambient air 132 is channeled past the fan 102, compressed in the low-pressure compressor 104 and the high-pressure compressor 106, mixed with fuel in the combustor 108 and ignited, thus generating hot combustion gases which flow through the high-pressure turbine 110 and the low-pressure turbine 112 and are discharged from the core engine 116 through the exhaust nozzle 126 as core or jet engine exhaust 136.

Figure 3:
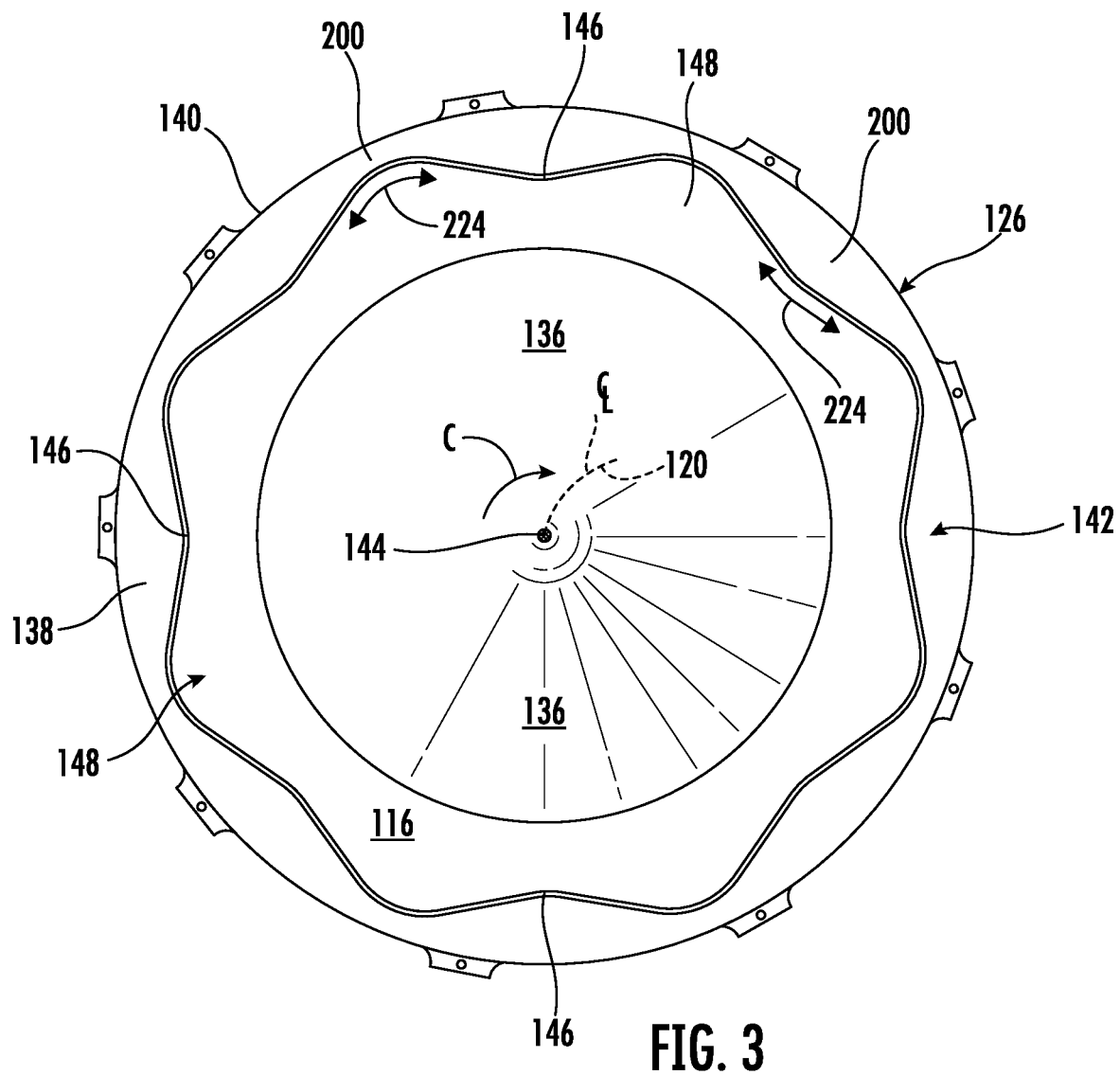
FIG. 3 is an aft-facing-forward isolation view of a core engine including an exhaust nozzle according to an exemplary embodiment of the present disclosure.
Figure 4:
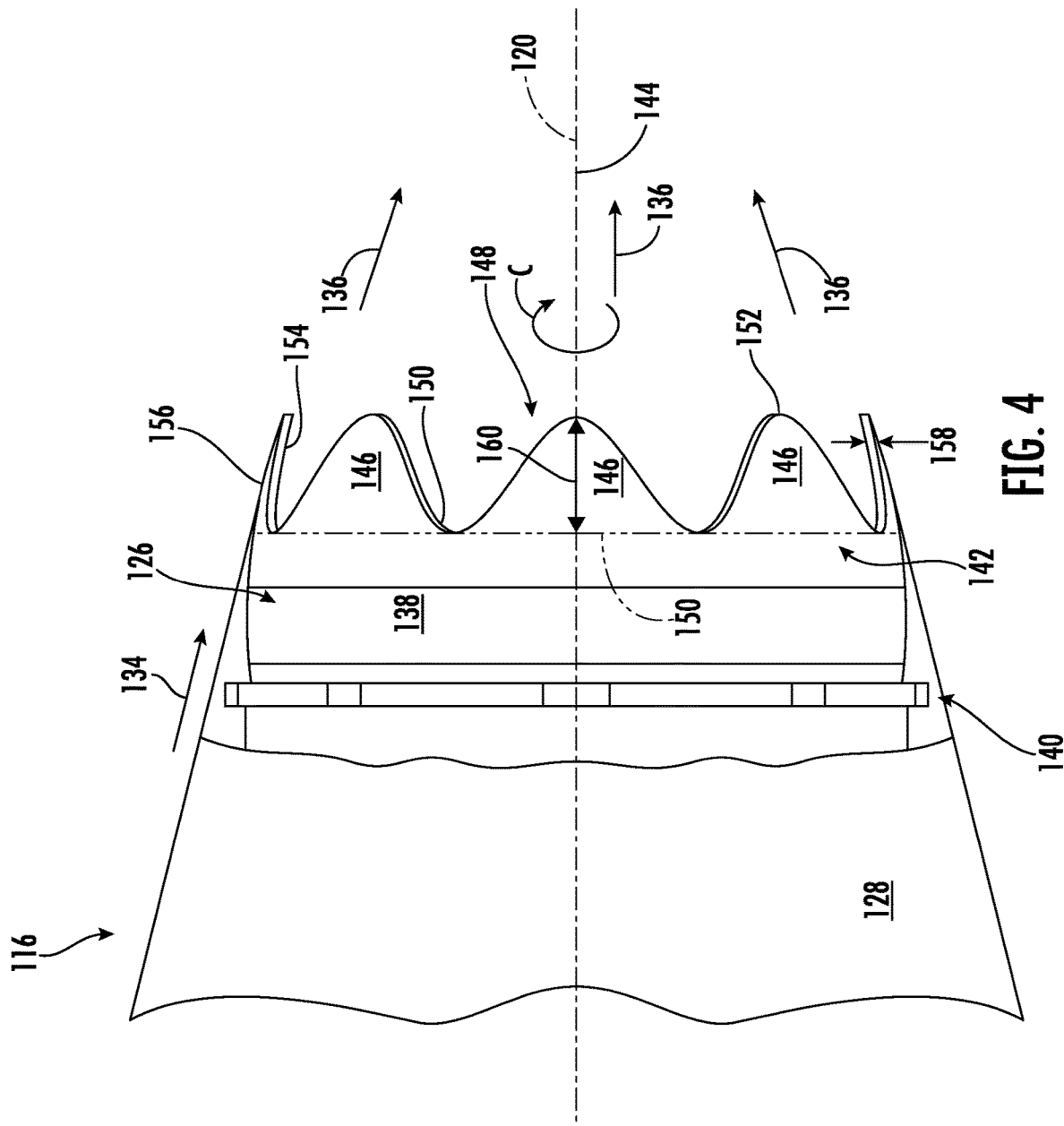
FIG. 4 is an enlarged view of an aft end of the core engine as shown in FIG. 3, according to an exemplary embodiment of the present disclosure.

FIG. 3 is an aft-facing-forward isolation view of the core engine 116 including the exhaust nozzle 126 as shown in FIG. 2. FIG. 4 is an enlarged view of the aft end 128 of the core engine 116 including the exhaust nozzle 126 according to exemplary embodiments of the present disclosure. In exemplary embodiments of the present disclosure, as shown in FIGS. 2, 3, and 4 collectively, the exhaust nozzle 126 is axisymmetric about the axial centerline 120 of the core engine 116. In exemplary embodiments, the center plug 124 shown in FIG. 2 is not present as illustrated in FIGS. 3 and 4 such as in the case of a turbojet style aircraft engine.

In exemplary embodiments, as shown in FIGS. 2, 3 and 4 collectively, the exhaust nozzle 126 includes a nozzle body 138. As shown in FIG. 4, the nozzle body 138 includes an upstream or forward end 140 and a downstream or aft end 142 that is axially spaced from the upstream end 140 with respect to axial centerline 120 of the core engine 116 and/or an axial centerline 144 of the nozzle body 138.

As shown in FIGS. 2, 3 and 4 collectively, the nozzle body 138 includes a plurality of chevrons 146 disposed at the downstream end 142 of the nozzle body 138. The plurality of chevrons 146 are circumferentially spaced apart in circumferential direction C with respect to axial centerline 120 and/or with the axial centerline 144 of the nozzle body 138.

The chevrons 146 extend downstream from the downstream end 142 of the nozzle body 138 in an axial direction with respect to axial centerline 144 of the nozzle body 138. In exemplary embodiments, as shown in FIGS. 3 and 4 collectively, the chevrons 146 are circumferentially sinuous or undulating and define an outlet 148 of the exhaust nozzle 126 through which the jet engine exhaust gases 136 are discharged for mixing with the fan exhaust 134 and/or ambient air. Although not shown, it is to be appreciated that the chevrons may have different shapes other than circumferentially sinusoidal or undulating. For example, one or more of the chevrons may be triangular or "V" shaped.

Figure 5:
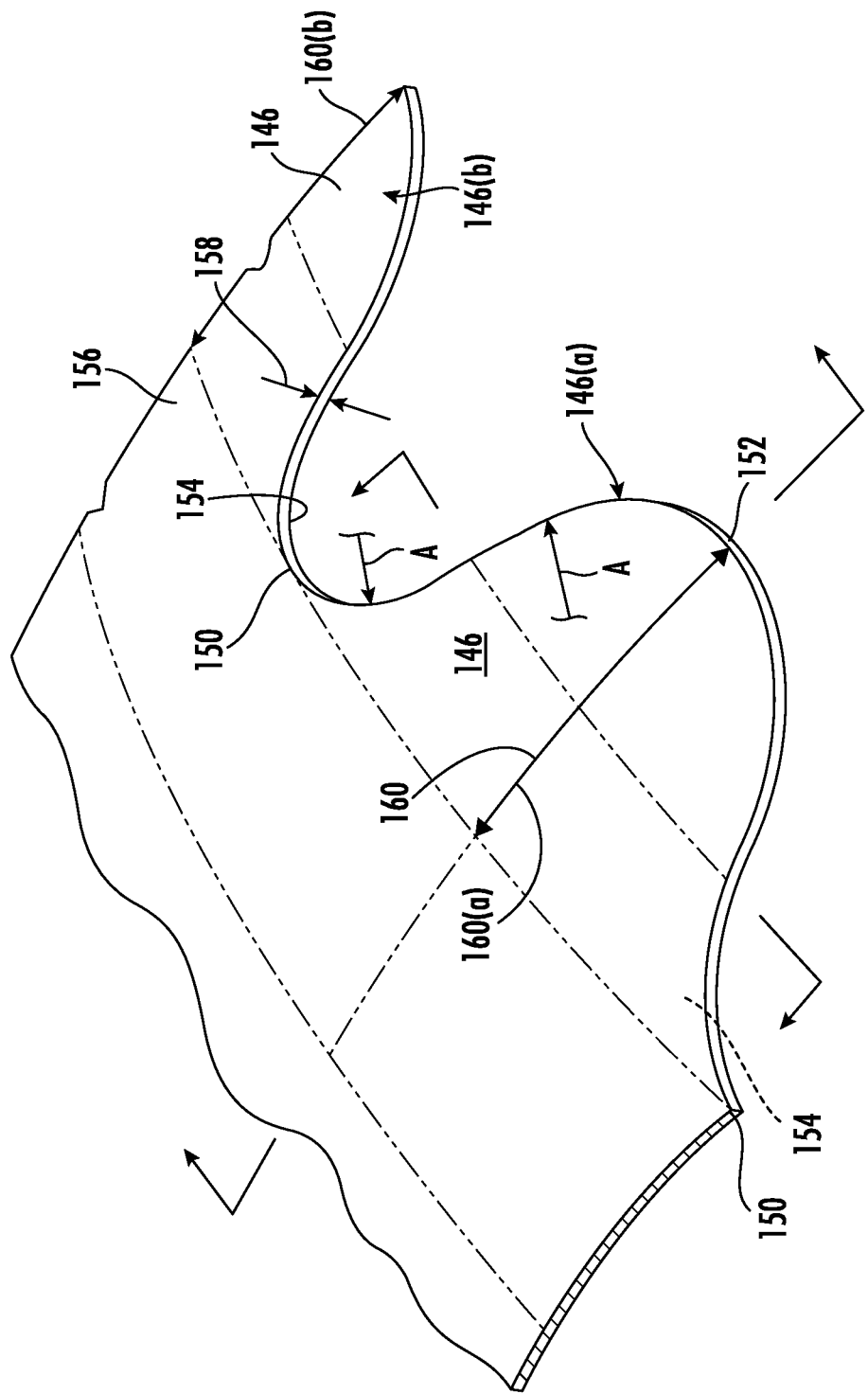
FIG. 5 is an enlarged perspective view of an exemplary chevron according to an exemplary embodiment of the present disclosure.

FIG. 5 provides is an enlarged perspective view of a portion of the nozzle body 138 including an exemplary chevron 146 of the plurality of chevrons 146 shown in isolation according to an exemplary embodiment of the present disclosure. As shown in FIGS. 4 and 5 collectively, each chevron 146 includes a root 150, a tip 152 axially spaced from the root 150, and an inner wall 154 radially spaced from an outer wall 156. The inner wall 154 and the outer wall 156 define a chevron wall thickness 158 therebetween. An overall axial length 160 of the chevron 146 is defined between the respective root 150 and tip 152. In an exemplary embodiment, as shown in FIG. 5, the overall axial length 160(a) of a first chevron 146(a) is less than an overall axial length 160(b) of a second chevron 146(b).

Figure 6:
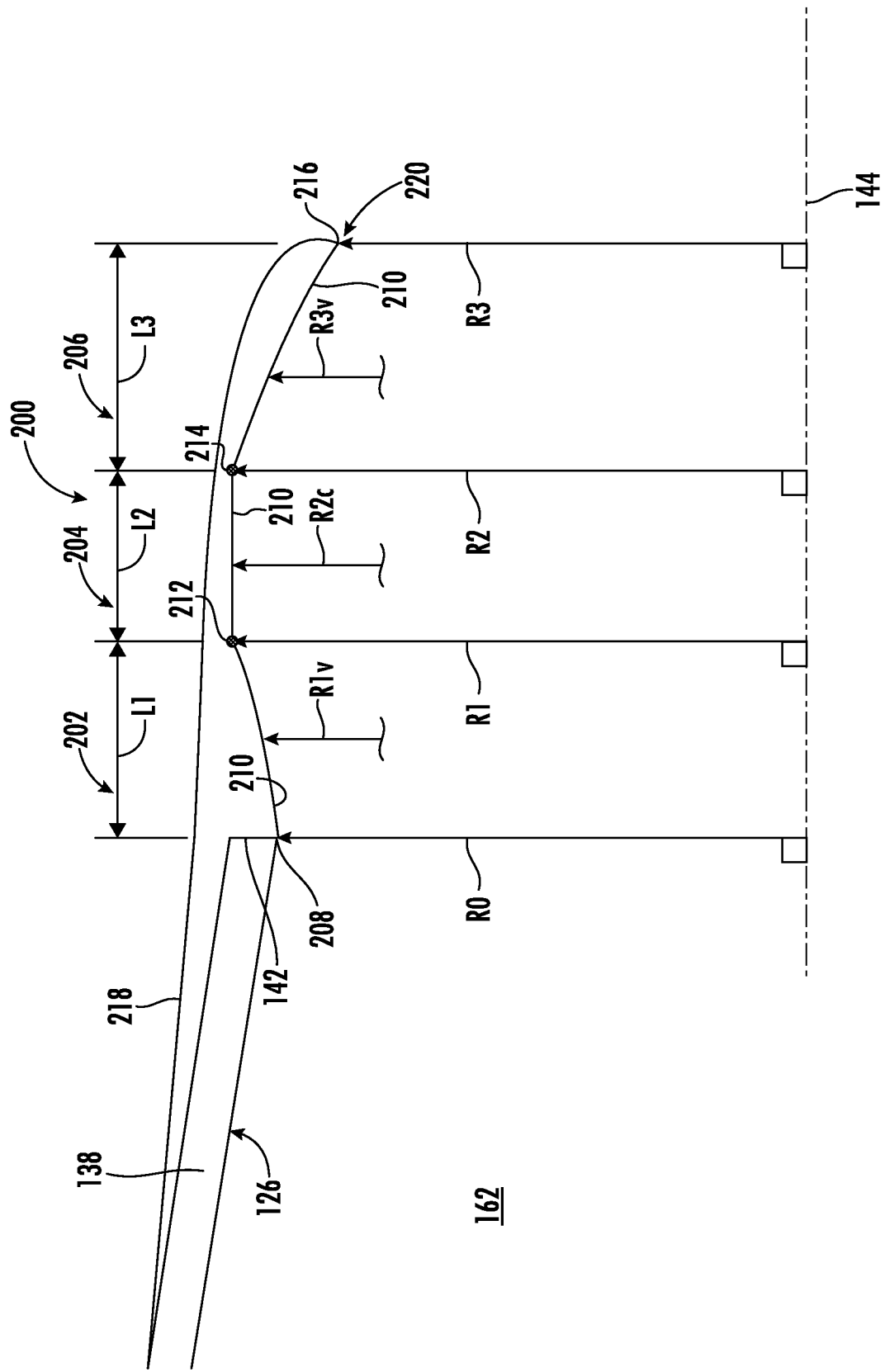
FIG. 6 is a cross-sectioned side view of an exemplary chevron as shown in FIG. 5 according to various exemplary embodiments of the present disclosure.
Figure 7:
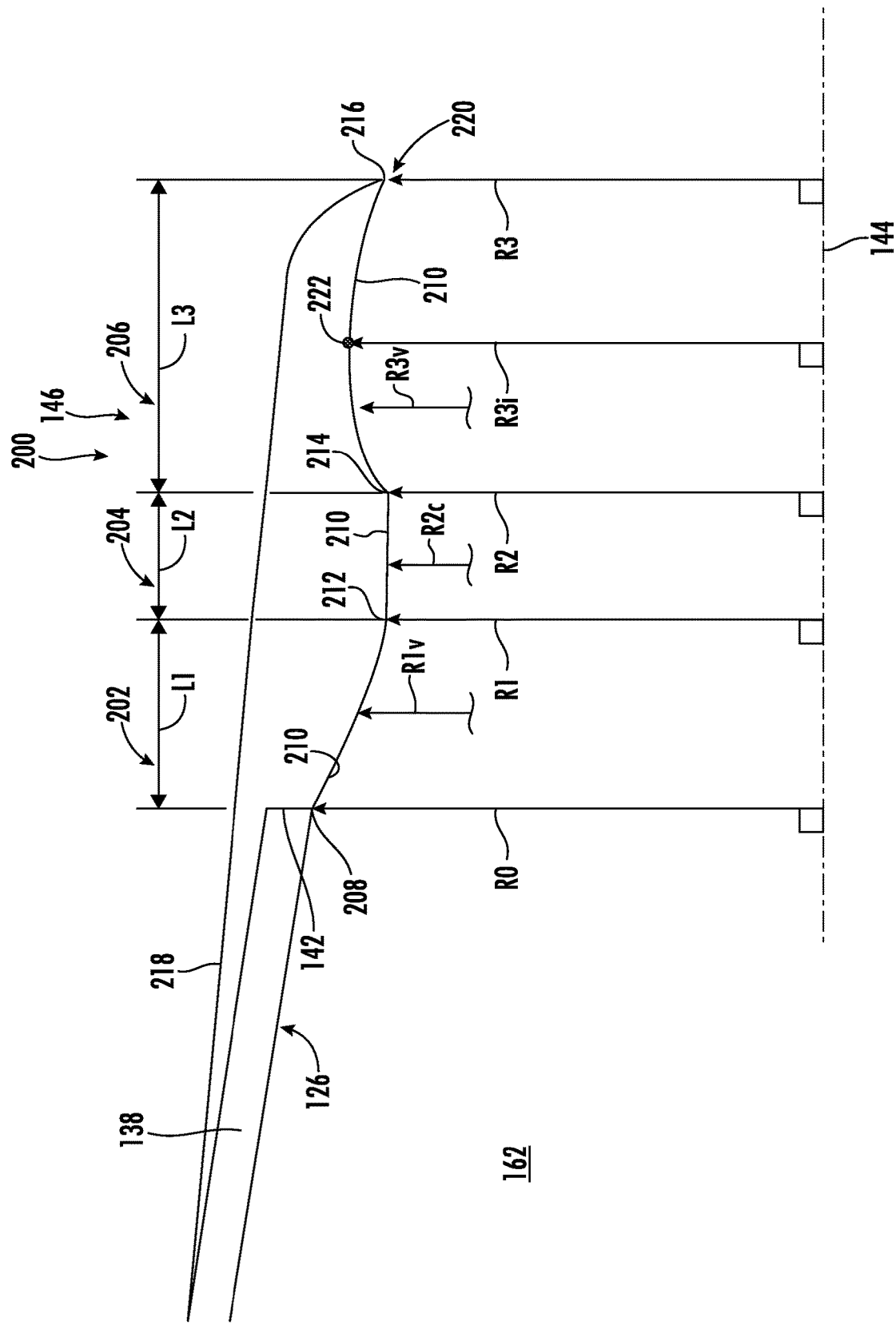
FIG. 7 is a cross-sectioned side view of an exemplary chevron as shown in FIG. 5 according to an exemplary embodiment of the present disclosure.
Figure 8:
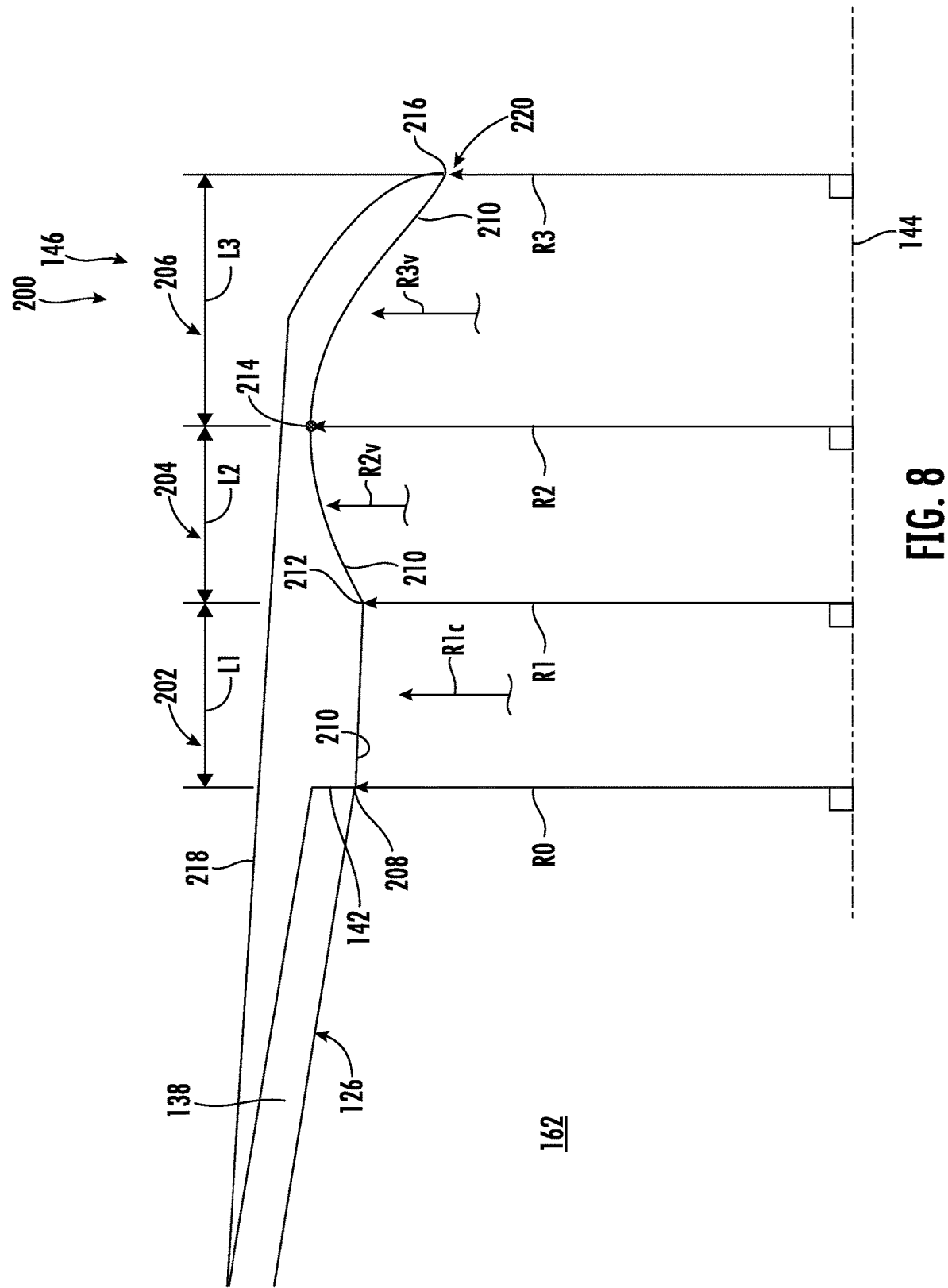
FIG. 8 is a cross-sectioned side view of an exemplary chevron as shown in FIG. 5 according to an exemplary embodiment of the present disclosure.

FIGS. 6, 7, and 8 provide cross-sectioned side views of an exemplary chevron 200 of the plurality of chevrons 146 as shown in FIG. 5 extending axially downstream from the downstream end 142 of the nozzle body 138, according to various exemplary embodiments of the present disclosure. As shown in FIGS. 6, 7, and 8 collectively, the chevron 200 includes or is divided into three distinct or distinguishable segments comprising a first segment 202, a second segment 204, and a third segment 206. In exemplary embodiments, the chevron 200 is disposed downstream from a throat 162 of the exhaust nozzle 126.

As shown in FIGS. 6, 7, and 8 collectively, the first segment 202 extends axially downstream from a root 208 of the chevron 200 a first axial distance L1 with respect to axial centerline 144 of the nozzle body 138. At the root 208, a portion of an inner wall 210 of the chevron 200 that extends along the first segment 202 has an initial or first radius R0 with respect to the axial centerline 144. The first segment 202 terminates at a first inflection or termination point 212 defined along the inner wall 210. The first inflection or termination point 212 has a radius R1 with respect to axial centerline 144 of the nozzle body 138. In an exemplary embodiment, a radius of curvature of the inner wall is continuous between the first, second, and third segments 202, 204, 206.

In particular embodiments, show in FIGS. 6 and 7, the inner wall 210 along the first segment 202 extends along the first axial distance L1 from the root 208 to the first inflection or termination point 212 at a variable radius R1v with respect to the axial centerline 144. In particular embodiments, as shown in FIG. 8, the inner wall 210 along the first segment 202 extends along the first axial distance L1 from the root 208 to the first inflection or termination point 212 at a constant radius R1c with respect to the axial centerline 144.

As used herein, the term "constant radius" is defined as an average slope of the inner wall 210 with respect to the axial centerline 144 along an axial distance L1, L2 or L3 of the respective segment such as the first segment 202, the second segment 204, or the third segment 206, wherein the average slope of the inner wall 210 is equal to or less than 10 degrees. For example, in certain embodiments, the average slope is less than or equal to 5 degrees. In certain embodiments, the average slope is less than or equal to 2.5 degrees. In certain embodiments, the average slope is less than or equal to 1.0 degree. In certain embodiments, the average slope is less than or equal to 0.5 degrees.

As shown in FIGS. 6, 7, and 8 collectively, the second segment 204 extends axially downstream from the first inflection or termination point 212 at radius R1, a second axial distance L2 with respect to axial centerline 144 of the nozzle body 138. The second segment 204 terminates at a second inflection or termination point 214 defined along the inner wall 210. The second inflection or termination point 214 has a second radius R2.

In particular embodiments, shown in FIGS. 6 and 7, the inner wall 210 along the second segment 204 extends along the second axial distance L2 from the first inflection or termination point 212 to the second inflection or termination point 214 at a constant radius R2c with respect to the axial centerline 144. In particular embodiments, as shown in FIG. 8, the inner wall 210 along the second segment 204 extends along the second axial distance L2 from the first inflection or termination point 212 to the second inflection or termination point 214 at a variable radius R2v with respect to the axial centerline 144.

As shown in FIGS. 6, 7, and 8 collectively, the third segment 206 extends axially downstream from the second inflection or termination point 214 with second radius R2 a third axial distance L3 with respect to axial centerline 144 of the nozzle body 138. The third segment 206 terminates at a third inflection or termination point 216 defined along the inner wall 210. In certain embodiments the third termination point 216 may be defined at a tip 220. The third inflection or termination point 216 has a third radius R3 with respect to the axial centerline 144.

In particular embodiments, as shown in FIGS. 6, 7, and 8 collectively, the inner wall 210 along the third segment 206 extends along the third axial distance L3 from the second inflection or termination point 214 to the third inflection or termination point 216 at a variable radius R3v with respect to the axial centerline 144. In an exemplary embodiment as shown in FIG. 6, at least a portion of an outer wall 218 of the chevron 200 starts upstream of the aft end 142 of the nozzle body 138. In other words, a portion of the outer wall 218 is faired in upstream from the nozzle body 138 aft end 142. In an exemplary embodiment, the faired in portion of the outer wall 218 has a variable slope between the faired in portion and the tip.

In the exemplary embodiment shown in FIG. 6, the radius of the inner wall 210 along the first segment 202 is variable R1v and continuously increasing along the first axial distance L1 with respect to the axial centerline 144 of the nozzle body 138 from the root 208 to the first inflection or termination point 212. The inner wall 210 along the second segment 204 maintains a constant radius R2c along the second axial distance L2 from the first inflection or termination point 212 to the second inflection or termination point 214. The inner wall 210 along the second segment 204 maintains a constant radius R2c at or near the first inflection or termination point 212 and the second inflection or termination point 214. The inner wall 210 along the third segment 206 has a variable radius R3v that is decreasing along the third axial distance L3 from the second inflection or termination point 214 to the third inflection or termination point 216 or tip 220. In the exemplary embodiment shown in FIG. 6, $R0<R1$, $R1=R2$, and $R2>R3$.

In the exemplary embodiment shown in FIG. 7, the radius of the inner wall 210 along the first segment 202 is variable R1v and continuously decreasing along first axial distance L1 with respect to the axial centerline 144 of the nozzle body 138 from the root 208 to the first inflection or termination point 212. The inner wall 210 along the second segment 204 maintains a constant radius R2c along second axial distance L2 from the first inflection or termination point 212 to the second inflection or termination point 214. The third segment 206 has a variable radius R3v that is increasing along second axial distance L2 from the second inflection or termination point 214 to an intermediate inflection or termination point 222 having radius R3i and then decreasing to the third inflection or termination point 216 or tip 220. In the exemplary embodiment shown in FIG. 7, $R0>R1$, $R1=R2$, $R2<R3i$ and $R3i>R3$.

In the exemplary embodiment shown in FIG. 8, the radius of the inner wall 210 of the first segment 202 has a constant radius R1c along first axial distance L1 with respect to the axial centerline 144 of the nozzle body 138 from the root 208 to the first inflection or termination point 212. The radius of the inner wall 210 along the second segment 204 along second axial distance L2 is variable and increasing with respect to the axial centerline 144 of the nozzle body 138 from the first inflection or termination point 212 to the second inflection or termination point 214. The third segment 206 has a variable radius R3v that is decreasing from the second inflection or termination point 214 to the third inflection or termination point 216 or the tip 220. In the exemplary embodiment shown in FIG. 8, R0=R1, R1<R2, R2>R3.

Figure 9:
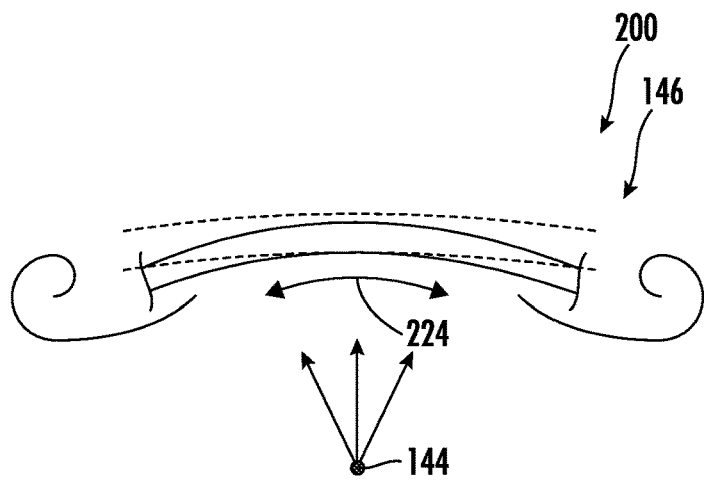
FIG. 9 is a forward-looking aft view of the chevron as shown in FIGS. 6, 7, and 8, according to an exemplary embodiment of the present disclosure.
Figure 10:
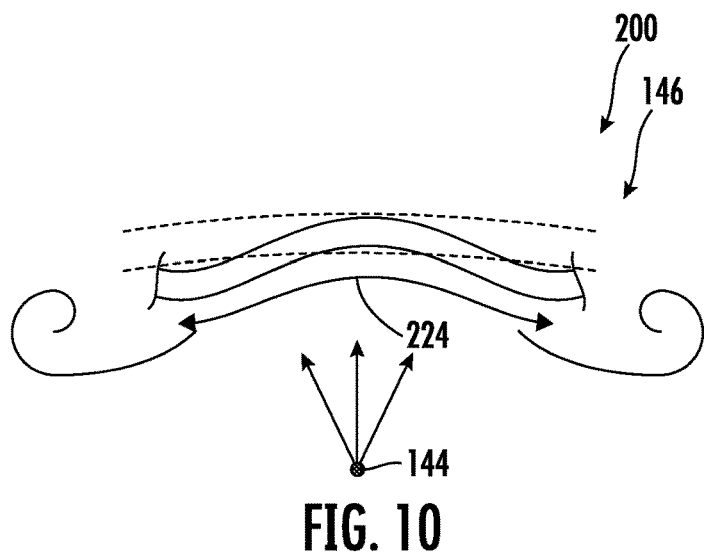
FIG. 10 is a forward-looking aft view of the chevron as shown in FIGS. 6, 7, and 8, according to an exemplary embodiment of the present disclosure.
Figure 11:
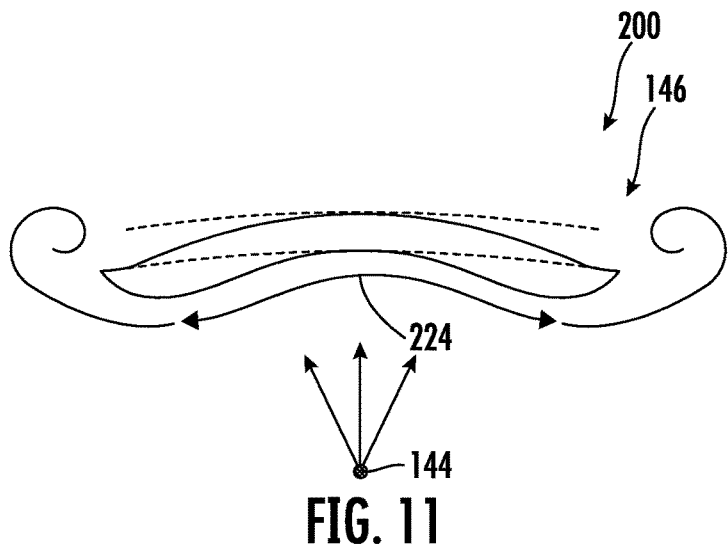
FIG. 11 is a forward-looking aft view of the chevron as shown in FIGS. 6, 7, and 8, according to an exemplary embodiment of the present disclosure.

FIGS. 9, 10 and 11 provide a forward-looking aft view of the chevron 200 of the plurality of chevrons 146 as shown in FIGS. 6, 7, and 8, according to an exemplary embodiment of the present disclosure. As shown in FIGS. 3, 9, 10, and 11 collectively, the chevron 200 has a circumferential profile 224 about the axial centerline 144 of the nozzle body 138.

In particular embodiments, as shown in FIG. 9, the circumferential profile 224 has a constant or non-varying curvature. In other embodiments, as shown in FIGS. 10 and 11, the chevron 200 has a circumferential profile 224 that varies azimuthally. The circumferential profile 224 may vary at any given axial location of the chevron 200 such as along any one or any combination of the first axial distance L1 of the first segment 202, the second axial distance L2 of the second segment 204 and/or the third axial distance L3 of the third segment 206. Further, as shown in FIGS. and 11, the wall thickness may vary circumferentially.

As shown in FIGS. 9-11, vortices develop over the side edges of the chevron 200 due to the pressure differential between the ambient and the interior of the exhaust nozzle 126 (FIG. 2). The strength and location of these mixing vortices relative to the shear layer created by the jet engine exhaust 136 (FIG. 2) is an important consideration in determining the mixing effectiveness of the chevrons 200. In some embodiments, tailoring the circumferential profile of the chevron 200 (e.g., thickness, curvature etc.) more effectively guides the flow to form mixing vortices. This may improve mixing effectiveness and noise reduction as compared to a chevron nozzle without a circumferential variation in profile 224. In other embodiments (not shown), the size of the chevron features (e.g., a width, axial length, penetration depth, contour etc.) may be non-uniform circumferentially to optimize mixing accounting for local variations in flow conditions when the engine is installed on an aircraft.

Chevron inner wall shapes disclosed herein can provide improved mixing. For instance, in existing designs for nozzle pressure ratios at or below choking (as is the case in commercial subsonic aircraft or commercial supersonic aircraft with a Programmed Lapse Rate (PLR) of thrust on takeoff), the flow inside the nozzle may accelerate from the root of the chevron to the tip. This reduces the static pressure inside the nozzle, thereby reducing the pressure differential with the ambient. The pressure differential is directly proportional to the strength of the mixing vorticity generated by chevrons. Since this pressure differential is reduced, chevron effectiveness is sub-optimal. As disclosed herein, by having a first segment of the chevron with increasing radius, the flow inside the nozzle decelerates, increasing pressure and the pressure differential responsible for generating mixing vorticity. By having a second segment of the chevron with a constant radius, this pressure differential is sustained for a longer axial distance before the chevron reduces in radius to the chevron tip in the third segment of the chevron. Thus, the shapes provided herein can increase chevron mixing authority for a given amount of chevron penetration into the flow (i.e. R3 relative to R0) or reduce the amount of chevron penetration required to provide a desired level of mixing. The thrust penalty of a chevron nozzle at cruise relative to a well-designed baseline nozzle increases with penetration, so any reduction in penetration is preferred for fuel efficiency.

It will be appreciated that although the chevrons described hereinabove and depicted in the figures are positioned at an exhaust nozzle of a gas turbine engine, in other exemplary embodiments, the chevrons may additionally or alternatively be positioned at an exhaust nozzle elsewhere in the gas turbine engine or in an exhaust nozzle of an electrically driven fan. For example, in other exemplary aspects, the chevrons of the present disclosure may be incorporated into a third stream exhaust nozzle at an outlet of a third stream of the gas turbine engine.

Further aspects are provided by the subject matter of the following clauses:

An exhaust nozzle for a gas turbine engine, the exhaust nozzle comprising: a nozzle body having an upstream end axially spaced from a downstream end with respect to an axial centerline of the nozzle body, and a plurality of chevrons circumferentially spaced apart and extending downstream from the downstream end, wherein each chevron includes an inner wall radially spaced from an outer wall, a root and a tip axially spaced from the root; wherein at least one chevron of the plurality of chevrons includes a first segment extending axially downstream from the root, a second segment extending axially downstream from the first segment, and a third segment extending axially downstream from the second segment to the tip, and wherein the inner wall extends along the first segment, the second segment and the third segment, and wherein the first segment is distinguishable from the second segment and the second segment is distinguishable from the third segment.

The exhaust nozzle of the preceding clause, wherein the inner wall along the first segment has a radius that is variable with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

The exhaust nozzle of any preceding clause, wherein the inner wall along the first segment has a radius that is increasing with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

The exhaust nozzle of any preceding clause, wherein the inner wall along the first segment has a radius that is constant with respect to the axial centerline from the root to a first inflection or termination point, the inner wall along the second segment has an increasing radius from the first inflection or termination point to a second inflection or termination point, and the inner wall along the third segment has a decreasing radius from the second inflection or termination point to the tip.

The exhaust nozzle of any preceding clause, wherein the inner wall of the at least one chevron of the plurality of chevrons has a continuous radius of curvature between each of the first segment, the second segment, and the third segment.

The exhaust nozzle of any preceding clause, wherein the at least one chevron of the plurality of chevrons has a circumferential profile, wherein the circumferential profile has a constant curvature.

The exhaust nozzle of any preceding clause, wherein the at least one chevron of the plurality of chevrons has a circumferential profile, wherein the circumferential profile has a variable curvature.

The exhaust nozzle of any preceding clause, wherein the first segment is disposed downstream from a throat of the exhaust nozzle.

The exhaust nozzle of any preceding clause, wherein an axial length of a first chevron of the plurality of chevrons is different from an axial length of a second chevron of the plurality of chevrons.

The exhaust nozzle of any preceding clause, wherein a portion of the outer wall is faired in upstream from the nozzle body downstream end, and wherein the outer wall has a variable slope between the faired in portion and the tip.

An aircraft, comprising: a fuselage, a wing and a turbofan engine, the turbofan engine including a turbine section and an exhaust nozzle disposed downstream from the turbine section, wherein the exhaust nozzle comprises: a nozzle body having an upstream end axially spaced from a downstream end with respect to an axial centerline of the nozzle body, and a plurality of chevrons circumferentially spaced apart and extending downstream from the downstream end, wherein each chevron includes an inner wall radially spaced from an outer wall, a root and a tip axially spaced from the root; wherein at least one chevron of the plurality of chevrons includes a first segment extending axially downstream from the root, a second segment extending axially downstream from the first segment, and a third segment extending axially downstream from the second segment to the tip, and wherein the inner wall extends along the first segment, the second segment and the third segment, and wherein the first segment is distinguishable from the second segment and the second segment is distinguishable from the third segment.

The aircraft of the preceding clause, wherein the inner wall along the first segment has a radius that is variable with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

The aircraft of any preceding clause, wherein the inner wall along the first segment has a radius that is increasing with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

The aircraft of any preceding clause, wherein the inner wall along the first segment has a radius that is constant with respect to the axial centerline from the root to a first inflection or termination point, the inner wall along the second segment has an increasing radius from the first inflection or termination point to a second inflection or termination point, and the inner wall along the third segment has a decreasing radius from the second inflection or termination point to the tip.

The aircraft of any preceding clause, wherein the at least one chevron of the plurality of chevrons has a circumferential profile, wherein the circumferential profile has a constant curvature.

The aircraft of any preceding clause, wherein the at least one chevron of the plurality of chevrons has a circumferential profile, wherein the circumferential profile has a variable curvature.

The aircraft of any preceding clause, wherein the first segment is disposed downstream from a throat of the exhaust nozzle.

The aircraft of any preceding clause, wherein an axial length of a first chevron of the plurality of chevrons is different from an axial length of a second chevron of the plurality of chevrons.

The aircraft of any preceding clause, wherein a portion of the outer wall is faired in upstream from the nozzle body downstream end, and wherein the outer wall has a variable slope between the faired in portion and the tip.

The aircraft of any preceding clause, wherein the inner wall of the at least one chevron of the plurality of chevrons has a continuous radius of curvature between each of the first segment, the second segment, and the third segment.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An exhaust nozzle for a gas turbine engine, the exhaust nozzle comprising:
   a nozzle body having an upstream end axially spaced from a downstream end with respect to an axial centerline of the nozzle body, and a plurality of chevrons circumferentially spaced apart and extending downstream from the downstream end, wherein each chevron includes an inner wall radially spaced from an outer wall, a root and a tip axially spaced from the root; and
   wherein at least one chevron of the plurality of chevrons includes a first segment extending axially downstream from the root, a second segment extending axially downstream from the first segment, and a third segment extending axially downstream from the second segment to the tip, and wherein the inner wall extends along the first segment, the second segment and the third segment; and
   wherein the first segment is distinguishable from the second segment and the second segment is distinguishable from the third segment; and
   wherein the inner wall along the first segment has a radius that is variable with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

2. The exhaust nozzle as in claim 1, wherein the inner wall of the at least one chevron of the plurality of chevrons has a continuous radius of curvature from the first segment to the third segment.

3. The exhaust nozzle as in claim 1, wherein the at least one chevron of the plurality of chevrons has a circumferential profile, wherein the circumferential profile has a variable curvature.

4. The exhaust nozzle as in claim 1, wherein the first segment is disposed downstream from a throat of the exhaust nozzle.

5. The exhaust nozzle as in claim 1, wherein an axial length of a first chevron of the plurality of chevrons is different from an axial length of a second chevron of the plurality of chevrons.

6. The exhaust nozzle as in claim 1, wherein a portion of the outer wall is faired in upstream from the nozzle body downstream end, and wherein the outer wall has a variable slope between the faired in portion and the tip.

7. An aircraft, comprising:
- a fuselage, a wing and a turbofan engine, the turbofan engine including a turbine section and an exhaust nozzle disposed downstream from the turbine section, wherein the exhaust nozzle comprises:
- a nozzle body having an upstream end axially spaced from a downstream end with respect to an axial centerline of the nozzle body, and a plurality of chevrons circumferentially spaced apart and extending downstream from the downstream end, wherein each chevron includes an inner wall radially spaced from an outer wall, a root and a tip axially spaced from the root; and
- wherein at least one chevron of the plurality of chevrons includes a first segment extending axially downstream from the root, a second segment extending axially downstream from the first segment, and a third segment extending axially downstream from the second segment to the tip, and wherein the inner wall extends along the first segment, the second segment and the third segment, wherein the first segment is distinguishable from the second segment and the second segment is distinguishable from the third segment; and
- wherein the inner wall along the first segment has a radius that is variable with respect to the axial centerline from the root to a first inflection or termination point, the inner wall along the second segment maintains a constant radius from the first inflection or termination point to a second inflection or termination point, and the inner wall along the third segment has a decreasing radius from the second inflection or termination point to the tip.

8. The aircraft of claim 7, wherein the at least one chevron of the plurality of chevrons has a circumferential profile, wherein the circumferential profile has a variable curvature.

9. The aircraft of claim 7, wherein the first segment is disposed downstream from a throat of the exhaust nozzle.

10. The aircraft of claim 7, wherein an axial length of a first chevron of the plurality of chevrons is different from an axial length of a second chevron of the plurality of chevrons.

11. The aircraft of claim 7, wherein a portion of the outer wall is faired in upstream from the nozzle body downstream end, and wherein the outer wall has a variable slope between the faired in portion and the tip.

* * * * *